(12) United States Patent
Kugumiya et al.

(10) Patent No.: US 8,065,081 B2
(45) Date of Patent: Nov. 22, 2011

(54) VEHICLE MOUNTED USER INTERFACE DEVICE AND VEHICLE MOUNTED NAVIGATION SYSTEM

(75) Inventors: Mamoru Kugumiya, Chiba (JP); Isao Watanabe, Tokyo (JP); Keisuke Ishii, Saitama (JP)

(73) Assignee: Sony Corporation (JP)

( * ) Notice: Subject to any disclaimer, the term of this patent is extended or adjusted under 35 U.S.C. 154(b) by 14 days.

(21) Appl. No.: 11/281,154

(22) Filed: Nov. 17, 2005

(65) Prior Publication Data
US 2006/0173616 A1 Aug. 3, 2006

(30) Foreign Application Priority Data

Nov. 19, 2004 (JP) ................................. 2004-336499

(51) Int. Cl.
*G01C 21/30* (2006.01)
*G01C 21/32* (2006.01)

(52) U.S. Cl. .......... 701/211; 701/36; 701/201; 701/202; 701/204; 701/207; 701/208; 701/209; 701/210

(58) Field of Classification Search .......... 701/200–226, 701/93, 36; 340/990, 994, 995.1, 995.12
See application file for complete search history.

(56) References Cited

U.S. PATENT DOCUMENTS

| | | | | |
|---|---|---|---|---|
| 5,627,547 A * | 5/1997 | Ramaswamy et al. | ... | 342/357.57 |
| 5,712,632 A * | 1/1998 | Nishimura et al. | ...... | 340/995.19 |
| 5,774,828 A * | 6/1998 | Brunts et al. | ................... | 701/210 |
| 5,887,269 A * | 3/1999 | Brunts et al. | ................... | 701/208 |
| 5,964,821 A * | 10/1999 | Brunts et al. | ................... | 701/201 |
| 5,987,377 A * | 11/1999 | Westerlage et al. | ........... | 701/204 |
| 6,594,580 B1 * | 7/2003 | Tada et al. | ..................... | 701/211 |
| 6,735,520 B2 * | 5/2004 | Nozaki | .......................... | 701/211 |
| 6,738,698 B2 * | 5/2004 | Ichihara et al. | ................. | 701/36 |
| 6,847,885 B2 * | 1/2005 | Sato et al. | ..................... | 701/201 |
| 6,868,333 B2 * | 3/2005 | Melen | ........................... | 701/200 |
| 7,039,522 B2 * | 5/2006 | Landau | .......................... | 701/211 |
| 7,135,993 B2 * | 11/2006 | Okamoto et al. | ........... | 340/995.1 |
| 7,630,831 B2 * | 12/2009 | Hagiwara | ..................... | 701/209 |

(Continued)

FOREIGN PATENT DOCUMENTS

JP 2000-321079 A 11/2000

(Continued)

*Primary Examiner* — Dalena Tran
*Assistant Examiner* — Jorge Peche
(74) *Attorney, Agent, or Firm* — Lerner, David, Littenberg, Krumholz & Mentlik, LLP

(57) ABSTRACT

Data is shared between a vehicle mounted navigation device and a vehicle mounted user interface device and among a plurality of vehicle mounted user interface devices. In a first location free display that allows a plurality of users to separately have access to the navigation device, external data obtained from the navigation device or from another location free display and its own user data are saved and managed, and shared with the navigation device and the another location free display. It is possible to utilize the external data not owned by itself or the user data of another person with the navigation device or the another location free display and perform a navigation process in an inner space of the vehicle efficiently.

1 Claim, 9 Drawing Sheets

U.S. PATENT DOCUMENTS

| | | | |
|---|---|---|---|
| 2001/0003825 A1* | 6/2001 | Gotou et al. | 709/203 |
| 2001/0008404 A1* | 7/2001 | Naito et al. | 345/745 |
| 2001/0047229 A1* | 11/2001 | Staggs | 701/3 |
| 2002/0138180 A1* | 9/2002 | Hessing et al. | 701/1 |
| 2002/0169539 A1* | 11/2002 | Menard et al. | 701/200 |
| 2002/0169551 A1* | 11/2002 | Inoue et al. | 701/213 |
| 2002/0188390 A1* | 12/2002 | Ichihara et al. | 701/36 |
| 2003/0033083 A1* | 2/2003 | Nakashima et al. | 701/211 |
| 2004/0054468 A1* | 3/2004 | Yamada et al. | 701/211 |
| 2004/0148090 A1* | 7/2004 | Melen | 701/200 |
| 2004/0150534 A1* | 8/2004 | Linn | 340/995.13 |
| 2005/0138662 A1* | 6/2005 | Seto | 725/75 |
| 2006/0155461 A1* | 7/2006 | Cho | 701/207 |
| 2006/0156209 A1* | 7/2006 | Matsuura et al. | 714/798 |
| 2007/0150184 A1* | 6/2007 | Kauvo et al. | 701/209 |
| 2010/0117810 A1* | 5/2010 | Hagiwara et al. | 340/425.5 |

FOREIGN PATENT DOCUMENTS

| | | |
|---|---|---|
| JP | 2002-007263 A | 1/2002 |
| JP | 2004-025937 A | 1/2004 |
| JP | 2004-077344 A | 3/2004 |
| JP | 2004-206471 A1 | 7/2004 |
| WO | 2004/093406 A1 | 10/2004 |

* cited by examiner

| INDIVIDUAL ID | DEVICE ID | STORAGE ID | NAME | CATEGORY ID | LONGITUDE | LATITUDE |
|---|---|---|---|---|---|---|

| INDIVIDUAL ID | DEVICE ID | STORAGE ID | NAME | LINK NUMBER (N) | START LONGITUDE | START LATITUDE |
|---|---|---|---|---|---|---|
| Link ID 1 | Link ID 2 | ... | ... | Link ID n-1 | Link ID n | |

| INDIVIDUAL ID | DEVICE ID | STORAGE ID | SECURITY LEVEL | NAME | LINK NUMBER (N) | START LONGITUDE |
|---|---|---|---|---|---|---|
| START LATITUDE | Link ID 1 | Link ID 2 | ... | ... | Link ID n-1 | Link ID n |

FIG. 15

VEHICLE MOUNTED USER INTERFACE DEVICE AND VEHICLE MOUNTED NAVIGATION SYSTEM

CROSS-REFERENCE TO RELATED APPLICATIONS

The present application claims priority from Japanese Patent Application No. JP 2004-336499 filed on Nov. 19, 2004, the disclosure of which is hereby incorporated by reference herein.

BACKGROUND OF THE INVENTION

The present invention relates to a vehicle mounted user interface device and a vehicle mounted navigation system, and is preferably applied to a vehicle mounted navigation system in which a navigation device installed near the driver's seat and a plurality of location free displays for use as a user interface device for back seat are linked by radio.

The vehicle mounted navigation system 101 in related art had such a configuration that a display 103 is connected to a navigation device 102, whereby only one user can operate one navigation device 102 at a time, as shown in FIG. 1.

In this navigation device 102, the map data stored in a hard disk drive 104 is read out by a disk reading part 105, and a map screen is generated based on the map data by a map display part 106 and sent out to a screen generation part 111, as shown in FIG. 2.

On the other hand, the navigation device 102 sends out the current position measured by a vehicle position measurement part 107 via the map display part 106 to the screen generation part 111. The screen generation part 111 generates a route guide screen based on the map screen supplied from the map display part 106 and the current position supplied from the vehicle position measurement part 107, and displays it on the display 103.

Also, the navigation device 102 recognizes a request received from a remote controller (hereinafter referred to as a remote control), not shown, in a user request processing part 109 and sends out the request to a User Interface (UI) display part 110.

The UI display part 110 reads the Point Of Interest (POI) data according to the request from a user data storage part 108, and sends out it to the screen generation part 111, which displays the route guide screen reconfigured by adding the site information based on the POI data on the display 103.

In FIG. 3, in which the corresponding parts to FIG. 1 are designated by the same reference numerals, a vehicle mounted navigation system 121 has a first location free display 122 and a second location free display 123 for use as a user interface device to the navigation device 102 that are linked by radio. The user on the back seat can employ the first location free display 122 and the second location free display 123 separately.

Since the first location free display 122 and the second location free display 123 have the same circuit configuration, for the sake of convenience, the first location free display 122 is only described, and the second location free display 123 is not described.

The first location free display 122 has data transmitting/receiving part 131 for transmitting or receiving data to or from the navigation device 102 in accordance with a near distance radio communication method, as shown in FIG. 4. For instance, the route guide screen acquired from the navigation device 102 is displayed via a map display part 132 and a screen generation part 133 on a display 134.

In the first location free display 122, a request received from the remote control is recognized by the user request processing part 137 and sent out via a UI display part 136 to the screen generation part 133.

The screen generation part 133 reads the POI data according to the request from a user data storage part 135, reconfigures the route guide screen by adding the site information based on the POI data to the map data, and displays it on the display 134.

In this way, in the vehicle mounted navigation system 121, the first location free display 122 and the second location free display 123 are accessible to the navigation device 102. Each user of the first location free display 122 and the second location free display 123 has separately access to the navigation device 102, whereby one navigation device 102 can be operated by plural users.

In this connection, there is a server system on the Internet which distributes the facility information or personal courses from the information registration apparatus of another person as well, upon a request from the vehicle mounted equipment (e.g., refer to Japanese Patent Laid-Open No. 2004-77344).

Also, there is a system in which a navigation support apparatus is shared among a plurality of users by preparing a private external storage device (e.g., refer to Japanese Patent Laid-Open No. 2000-321079).

By the way, in the vehicle mounted navigation system 121 of the above configuration, there was a problem that the user of the first location free display 122 and the second location free display 123 separately has access to the navigation device 102 to make the route retrieval, but the route data such as the route retrieval result acquired by the first location free display 122 or the second location free display 123 is owned by each location free display and can not be shared.

SUMMARY OF THE INVENTION

The present invention has been achieved in light of the above-mentioned problem, and has as its objective to offer a vehicle mounted user interface device that is user-friendly, and a vehicle mounted navigation system, in which data can be shared between a vehicle mounted navigation device and the vehicle mounted user interface device and among a plurality of vehicle mounted user interface devices.

To solve the above problem, the present invention provides a vehicle mounted user interface device through which a plurality of users separately have access to a vehicle mounted navigation device, the user interface device including a transmitter-receiver operable to transmit data to or to receive data from the vehicle mounted navigation device by gaining access to the vehicle mounted navigation device, and a data management unit operable to save and manage external data obtained from the vehicle mounted navigation device or from another vehicle mounted user interface device and its own user data and to share the external data and the user data with the vehicle mounted navigation device or the another vehicle mounted user interface device.

Thereby, since the external data and the user data can be shared among the vehicle mounted navigation device and the vehicle mounted user interface devices, the external data not owned by itself or the user data of another person can be effectively utilized to perform a navigation process efficiently in an inner space of the vehicle.

Also, according to the invention, there is provided a vehicle mounted navigation system including a vehicle mounted navigation device; and a vehicle mounted user interface device through which a plurality of users separately have access to the vehicle mounted navigation device, the vehicle mounted user interface device including a transmitter-receiver operable to transmit data to or to receive data from the vehicle mounted navigation device by gaining access to the vehicle mounted navigation device; and a data management unit operable to save and manage external data obtained from the vehicle mounted navigation device or from another vehicle mounted user interface device and its own user data and to share the external data and the user data with the vehicle mounted navigation device or the another vehicle mounted user interface device.

Thereby, since the external data and the user data can be shared among the vehicle mounted navigation device and the vehicle mounted user interface devices, the external data not owned by itself or the user data of another person can be effectively utilized to perform a navigation process efficiently in an inner space of the vehicle.

With the invention, since the external data and the user data can be shared among the vehicle mounted navigation device and another vehicle mounted user interface device, a vehicle mounted user interface device and the vehicle mounted navigation system can be realized in which the external data not owned by itself or the user data of another person can be effectively utilized to perform a navigation process efficiently in an inner space of the vehicle.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 15 is a schematic diagram showing the data structure of route data according to the third embodiment.

DETAILED DESCRIPTION

One embodiment of the present invention will be described with reference to the drawings.

Figure 5:
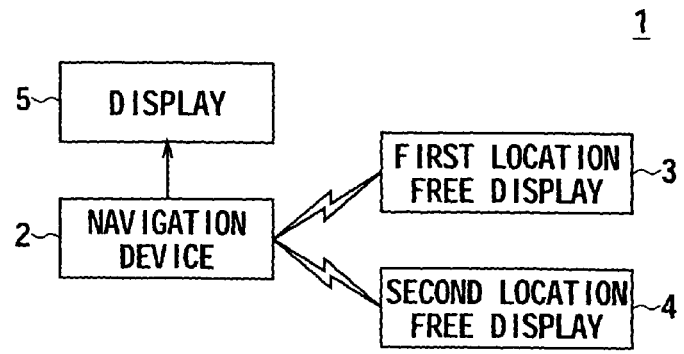
FIG. 5 is a schematic block diagram showing the overall configuration of a vehicle mounted navigation system according to a first embodiment of the invention.

(1) First Embodiment (1-1) Overall Configuration of Vehicle Mounted Navigation System In FIG. 5, reference numeral 1 designates a vehicle mounted navigation system 1 according to the first embodiment as a whole. A first location free display 3 and a second location free display 4 that are used as a user interface device for the back seat are linked by radio in near distance to the navigation device 2 installed near the driver's seat. Also, the first location free display 3 and the second location free display 4 are connected to each other in near distance without wire. The user on the back seat can separately employ the first location free display 3 and the second location free display 4.

(1-2) Circuit Configuration of Navigation Device

Figure 1:
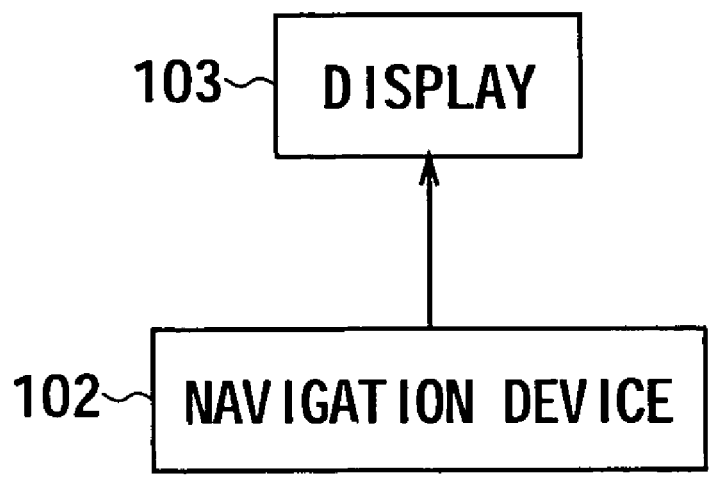
FIG. 1 is a schematic block diagram showing the configuration (1) of a vehicle mounted navigation system in related art.
Figure 2:
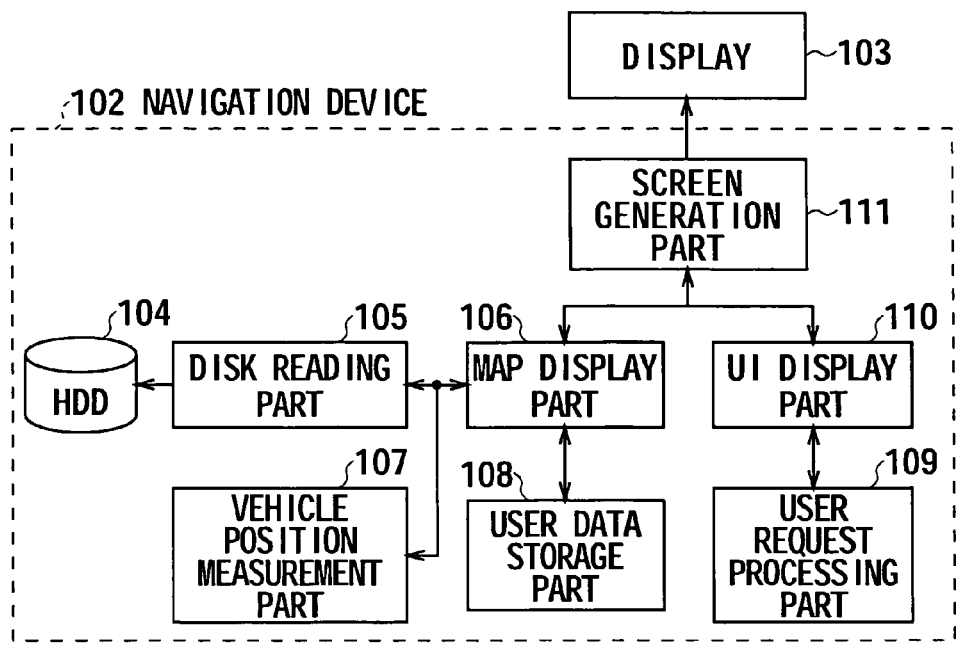
FIG. 2 is a schematic block diagram showing the circuit configuration of the vehicle mounted navigation system.
Figure 6:
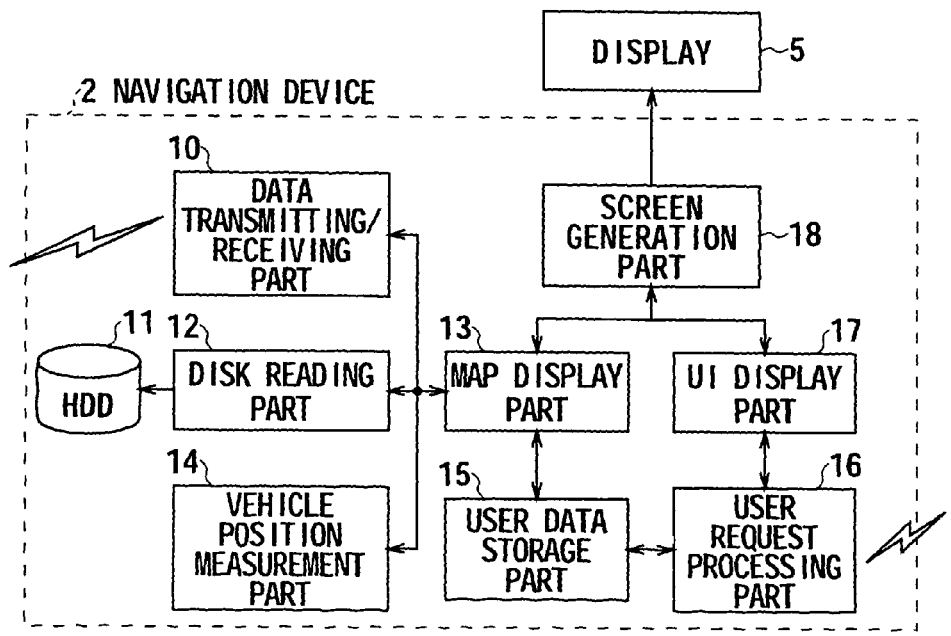
FIG. 6 is a schematic block diagram showing the circuit configuration of a navigation device.

As shown in FIG. 6 in which the corresponding parts to FIG. 2 are designated by the same reference numerals, in the navigation device 2, the map data stored in a hard disk drive 11 is read out by a disk reader 12, a map screen based on the map data is generated by a map display part 13 and sent out to a screen generation part 18.

On the other hand, the navigation device 2 sends out the current position measured by a vehicle position measurement part 14 via the map display part 13 to the screen generation part 18. The screen generation part 18 generates a route guide screen based on the map screen supplied from the map display part 13 and the current position supplied from the vehicle position measurement part 14, and displays it on a display 5.

Also, the navigation device 2 has data transmitting/receiving part 10 for transmitting or receiving data to or from the first location free display 3 or the second location free display 4 in accordance with a near distance radio communication system such as Bluetooth or Institute of Electrical and Electronics Engineers (IEEE) 802.11g. The user data such as POI data or route data received from the first location free display 3 or the second location free display 4 via the data transmitting/receiving part 10 and owned by the first location free display 3 or the second location free display 4 is stored in the user data storage part 15.

Moreover, the navigation device 2 recognizes a request received from a remote controller, not shown, in a user request processing part 16 and sends the request via a UI display part 17 to the screen generation part 18.

The screen generation part 18 reads the POI data according to the request from the user data storage part 15, reconfigures a route guide screen by adding the site information based on the POI data to the map data, and displays it on the display 5.

(1-3) Circuit Configuration of First and Second Location Free Displays

The circuit configuration of the first location free display 3 and the second location free display 4 will be described below. Since the first location free display 3 and the second location free display 4 have the same configuration, the first location free display 3 is only described here for the sake of convenience, and the second location free display 4 is not described.

Figures 7, 8:
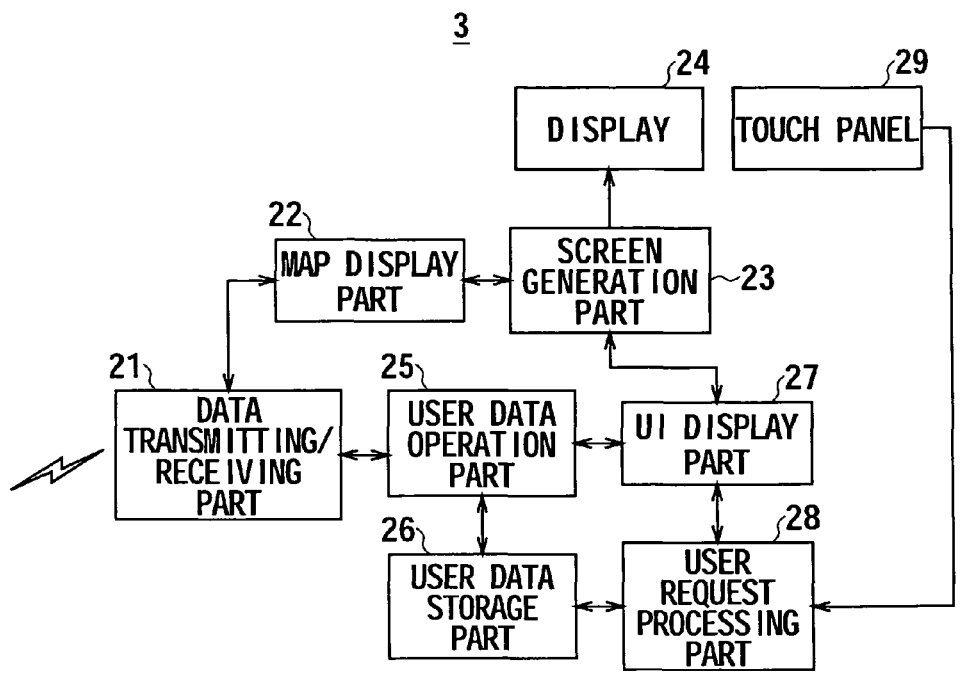
FIG. 7 is a schematic block diagram showing the circuit configuration of a first location free display according to the first embodiment.
FIG. 8 is a schematic diagram showing the data structure of POI data according to the first embodiment.

As shown in FIG. 7, the first location free display 3 has data transmitting/receiving part 21 for transmitting or receiving data to or from the navigation device 2 or the second location free display 4 in accordance with a near distance radio communication system such as Burette or IEEE802.11g. For instance, the route guide screen based on the route data acquired from, for example, the navigation device 2 is displayed on a display 24 via a map display part 22 and a screen generation part 23.

The first location free display 3 can exchange data via the data transmitting/receiving part 21 with the second location free display 4. The user data such as POI data or route data acquired from the second location free display 4 via the data transmitting/receiving part 21 is stored in the user data storage part 15 via a user data operation part 25.

In the first location free display 3, a request inputted via a touch panel 29 on the display 24 is recognized by a user request processing part 28 and sent to the screen generation part 18 via the UI display part 27.

The screen generation part 18 reads, for example, the POI data according to the request from the user data storage part 26 via the user data operation part 15, reconfigures the route guide screen by adding the site information based on the POI data to the map data, and displays it on the display 24.

Figure 4:
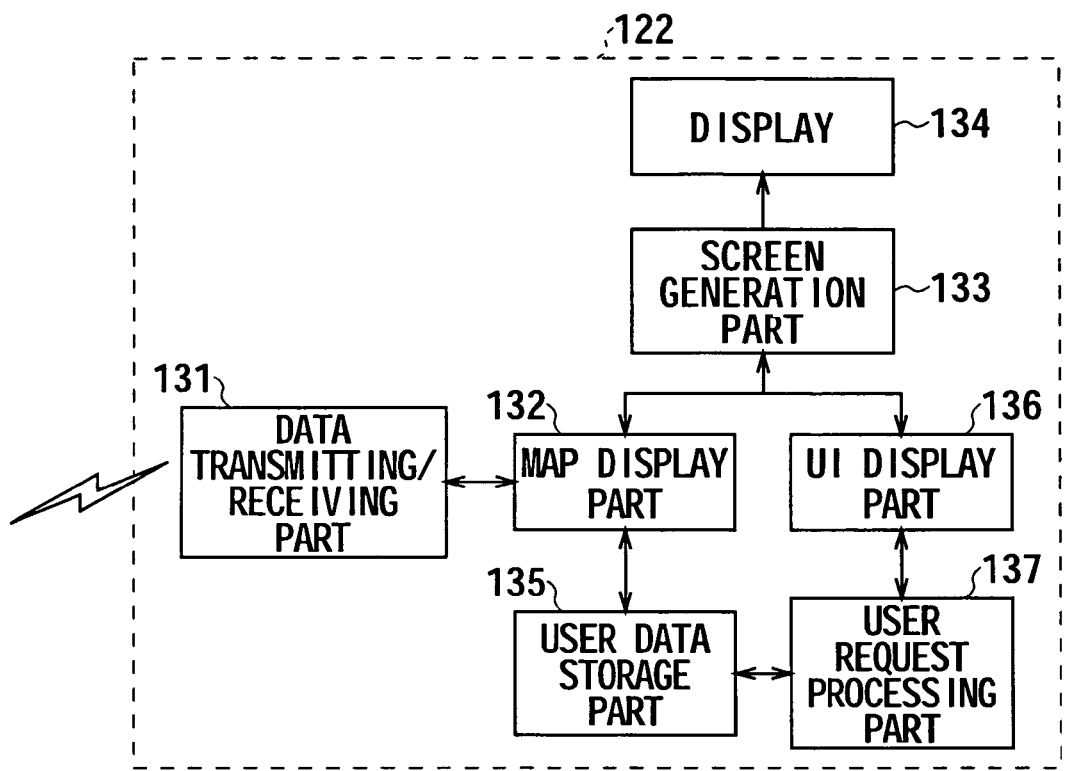
FIG. 4 is a schematic block diagram showing the circuit configuration of the first and second location free displays in related art.

The first location free display 3 can receive the POI data of another person or the route data as shown in FIGS. 4 and 5 from the navigation device 2 or another second location free display 4. The POI data or route data of another person and the POI data or route data held in the user data storage part 26 itself are combined (or merged) by the UI display part 27, and rearranged (or sorted) to produce the merge/sort data in a predetermined table format, and a user data table in a predetermined format based on the merge/sort data is displayed on the display 24 via the screen generation part 23.

In this connection, the POI data means the site data, including "individual Identification (ID)" identifying the first location free display 3 or the second location free display 4 separately, "device type ID" indicating the device type of the first location free display 3 or the second location free display 4, "storage ID" identifying the user data storage part or an external storage device (FIGS. 6 and 7) described later for use as the storage unit, "name" indicating the name of site (e.g., name of store), "category ID" indicating the genre of store (e.g., family restaurant, convenience store, gasoline stand, etc.) existing at its site and "longitude" and "latitude" indicating the site.

Also, the route data means the data of route search result from a certain departure place to a destination place, including "individual ID", "device type ID", "storage ID", and "name", like the POI data, and further "link number" indicating the number of links composing the route, "start longitude" and "start latitude" indicating the departure place, and "link ID1" to "link IDn" indicating the each link.

The POI data and route data are employed as the index data for making up the user data table, and the detailed information as to the POI data and route data is owned by the navigation device 2 or the first location free display 3 and the second location free display 4 itself.

When the user selects a desired item from the user data table displayed on the display 24, the first location free display 3 reads the detailed information of the POI data or route data corresponding to the selected item from the user data storage part 26 and displays it on the display 24, if it exists in the user data storage part 26.

On the other hand, the first location free display 3 acquires the detailed information of the POI data or route data corresponding to the selected item from the navigation device 2 or the second location free display 4, if the detailed information of the POI data or route data corresponding to the selected item from the user data table does not exist in its own user data storage part 26 but exists in the navigation device 2 or the second location free display 4.

More specifically, the first location free display 3 sends the POI data or route data corresponding to the selected item as the index data to the navigation device 2 or the second location free display 4, and acquires the detailed information corresponding to the index data from the navigation device 2 or the second location free display 4, if the detailed information of the POI data or route data corresponding to the selected item does not exist in its own user data storage part 26 but exists in the navigation device 2 or the second location free display 4.

Naturally, the navigation device 2 or the second location free display 4, like the first location free display 3, receives the POI data or route data as the index data from the first location free display 3, the second location free display 4 or the navigation device 2 other than itself to produce the user data table, and acquires the detailed information corresponding to the selected item based on the user data table.

(1-4) Operation and Effect

In the vehicle mounted navigation system 1 of the above configuration, the navigation device 2, the first location free display 3 and the second location free display 4 are linked by radio in near distance to communicate the index data such as POI data or route data held mutually, create the user data table, and display it on the displays 5, 24 of the navigation device 2, the first location free display 3 and the second location free display 4, whereby each user can visually recognize the existence of POI data or route data held in the entire system.

In this case, the first location free display 3 displays the user data table concerning a list of POI data or route data owned by the entire system on the display 24, and enables the user to confirm by the eyes by a simple operation of prompting the user to select an item from the user data table, as if the user acquired the detailed information concerning the POI data or route data of another person and owned the detailed information by oneself.

Particularly in the vehicle mounted navigation system 1, the navigation device 2, the first location free display 3 and the second location free display 4 are operable to communicate the index data such as POI data or route data, and possess the detailed information to provide the detailed information, if requested, whereby the transfer efficiency is improved and the memory capacity of the user data storage part 15, 26 is not increased more than necessary.

For example, when the user selects a desired item from the user data table displayed on the display 24, the first location free display 3 reads the detailed information from the user data storage part 26 and displays it on the display 24, if the detailed information concerning the POI data or route data corresponding to the selected item is owned by the user data storage part 26, whereby the detailed information can be provided in real time at the timing when the item is selected.

On the other hand, the first location free display 3 automatically sends the POI data or route data corresponding to the selected item as the index data to the navigation device 2 or the second location free display 4, and acquires the detailed information corresponding to the selected item from the navigation device 2 or the second location free display 4, if the detailed information of the POI data or route data corresponding to the selected item desired by the user that is selected from the user data table does not exist in its own user data storage part 26 but exists in the navigation device 2 or the second location free display 4, whereby the user acquires the necessary detailed information simply by selecting an item from the user data table without making any complicate input operation.

With the above configuration, in the vehicle mounted navigation system 1, the index data such as POI data or route data is shared among the navigation device 2, the location free display 3 and the second location free display 4, and the necessary detailed information is provided or acquired, when necessary, whereby the transfer efficiency is improved, and the user can separately employ the navigation device 2, the first location free display 3 and the second location free display 4 within an inner space of the vehicle in greater availability.

Figures 9, 10:
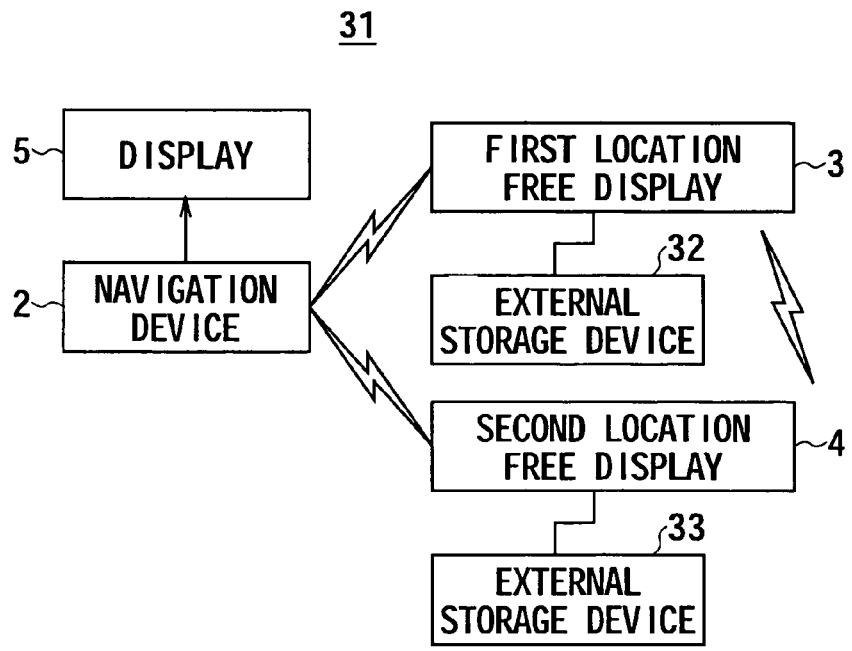
FIG. 9 is a schematic diagram showing the data structure of route data according to the first embodiment.
FIG. 10 is a schematic block diagram showing the overall configuration of a vehicle mounted navigation system according to a second embodiment of the invention.

(2) Second Embodiment (2-1) Overall Configuration of Vehicle Mounted Navigation System In FIG. 10, in which the corresponding parts to FIG. 5 are designated by the same reference numerals, reference numeral 31 designates a vehicle mounted navigation system according to the second embodiment. A first location free display 3 and a second location free display 4 that are used as a user interface device are linked by radio in near distance to a navigation device 2. Also, the first location free display 3 and the second location free display 4 are connected to each other in near distance without wire. The user on the back seat can separately employ the first location free display 3 and the second location free display 4.

In the vehicle mounted navigation system 31, the external storage devices 32 and 33 are connected to the first location free display 3 and the second location free display 4, respectively. The index data of POI data or route data stored in a removable memory such as a compact flash (registered trademark), a memory stick (registered trademark) or a Compact Disc-Read Only Memory (CD-ROM) via the external storage devices 32 and 33, and its detailed information, can be taken in.

In this connection, in the vehicle mounted navigation system 31 according to the second embodiment, the circuit configuration of the navigation device 2 is identical to that described in the first embodiment, and not described here.

(2-2) Process of First Location Free Display

The circuit configuration of the first location free display 3 and the second location free display 4 is identical to that of the first embodiment, except that the external storage devices 32 and 33 are only connected, and is not described here. A process of the first location free display 3 where the external storage device 32 is employed will be described below. A process of the second location free display 4 where the external storage device 33 is employed is equivalent to that of the first location free display 3.

In the first location free display 3, the POI data or route data edited by an external personal computer as the index data is read via the external storage device 32 from a removable medium, and stored in the user data storage part 26.

At this time, in the first location free display 3, the index data of POI data or route data read from the removable medium via the external storage device 32 and the index data of POI data or route data of its own read from its own user data storage part 26 via the user data operation part 25 are merged and sorted by the UI display part 27 to produce a user data table, and display it on the display 24 via the screen generation part 23.

By the way, in the UI display part 27, the POI data or route data read from the removable medium via the external storage device 32 has the number of the first location free display 3 appended as the device ID, and the last number appended as the storage ID to locate the external storage device 32 in the entire vehicle mounted navigation system 31, whereby the external storage device 32 not fixed at the connection location can be uniquely specified in the location.

Accordingly, if it is recognized that the detailed information of the POI data or route data exists in its own user data storage part 26 based on the device ID and the storage ID of the POI data or route data corresponding to the selected item from the user data table, the first location free display 3 reads the detailed information from the user data storage part 26, and displays it on the display 24.

On the other hand, if it is recognized that the detailed information of the POI data or route data exists in the removable medium of the external storage device 32 based on the device ID and the storage ID of the POI data or route data corresponding to the selected item from the user data table, the first location free display 3 reads the detailed information from the external storage device 32 and displays it on the display 24.

In this way, the first location free display 3 can share the detailed information concerning the POI data or route data stored in the removable medium via the external storage device 32 with the navigation device 2 and the second location free display 4.

(2-3) Operation and Effect

In the vehicle mounted navigation system 31 of the above configuration, according to the second embodiment, the external storage device 32 connected to the first location free display 3 has the number of storage ID appended, and the storage device ID is specified by the POI data or route data and employed as the index data to create the user data table.

In the vehicle mounted navigation system 31, each of the first location free display 3, the navigation device 2 and the second location free display 4 creates and employs the user data table, whereby the navigation device 2 and the second location free display 4 can easily acquire the detailed information from the external storage device 32 via the first location free display 3, even if the storage location for the detailed information of the POI data or route data corresponding to the selected item based on the user data table by the navigation device 2 and the second location free display 4 is in the external storage device 32 connected to the first location free display 3.

Also, in the vehicle mounted navigation system 31, the POI data or routed at a stored in the removable medium is read via the external storage devices 32 and 33 connected to the first location free display 3 and the second location free display 4, and employed as the index data to enable the detailed information of the POI data or route data edited by an external personal computer other than the navigation device 2, the first location free display 3 and the second location free display 4 existing within an inner space of the vehicle to be shared through the removable medium, thereby further increasing the availability.

More specifically, when the user employs a taxi, the vehicle mounted navigation system 31 can acquire the POI data concerning the destination of the user via the removable medium, if the vehicle mounted navigation system 31 is mounted on the taxi, whereby the detailed information concerning the destination can be provided to the driver properly and securely.

Also, in the vehicle mounted navigation system 31, because the user can acquire the POI data concerning the destination acquired on the Internet via the removable medium, the wide information from the outside can be taken into the system.

In the vehicle mounted navigation system 31 of the above configuration, the navigation device 2, the first location free display 3 and the second location free display 4 can mutually create the user data table, employing the index data of POI data or route data, and acquire the detailed information of POI data or route data corresponding to the selected item from the user data table via the first location free display 3 and the second location free display 4 from the external storage devices 32 and 33, whereby the external information of the system can be shared.

Figure 12:
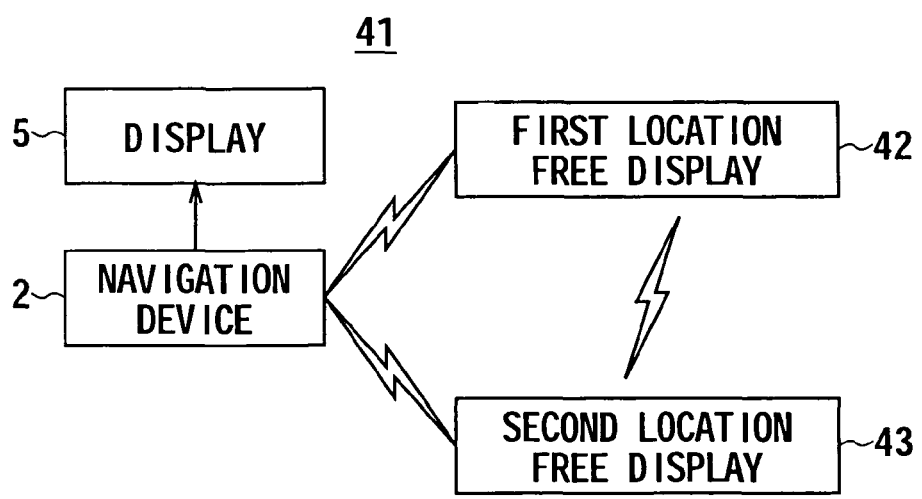
FIG. 12 is a schematic block diagram showing the overall configuration of a vehicle mounted navigation system according to a third embodiment of the invention.

(3) Third Embodiment (3-1) Overall Configuration of Vehicle Mounted Navigation System In FIG. 12, in which the corresponding parts to FIG. 5 are designated by the same reference numerals, reference numeral 41 designates a vehicle mounted navigation system according to the third embodiment. A first location free display 42 and a second location free display 43 that are used as a user interface device are linked by radio in near distance to the navigation device 2. Also, the first location free display 42 and the second location free display 43 are connected to each other in near distance without wire. The user on the back seat can separately employ the first location free display 42 and the second location free display 43.

In the vehicle mounted navigation system 41 according to the third embodiment, the circuit configuration of the navigation device 2 is identical to that described in the first embodiment, and not described here.

(3-2) Circuit Configuration of First and Second Location Free Displays

The circuit configuration of the first location free display 42 and the second location free display 43 will be described below. Because the first location free display 42 and the second location free display 43 have the same circuit configuration, for the sake of convenience, the explanation of the first location free display 42 is only made and the explanation of the second location free display 43 is omitted.

Figure 13:
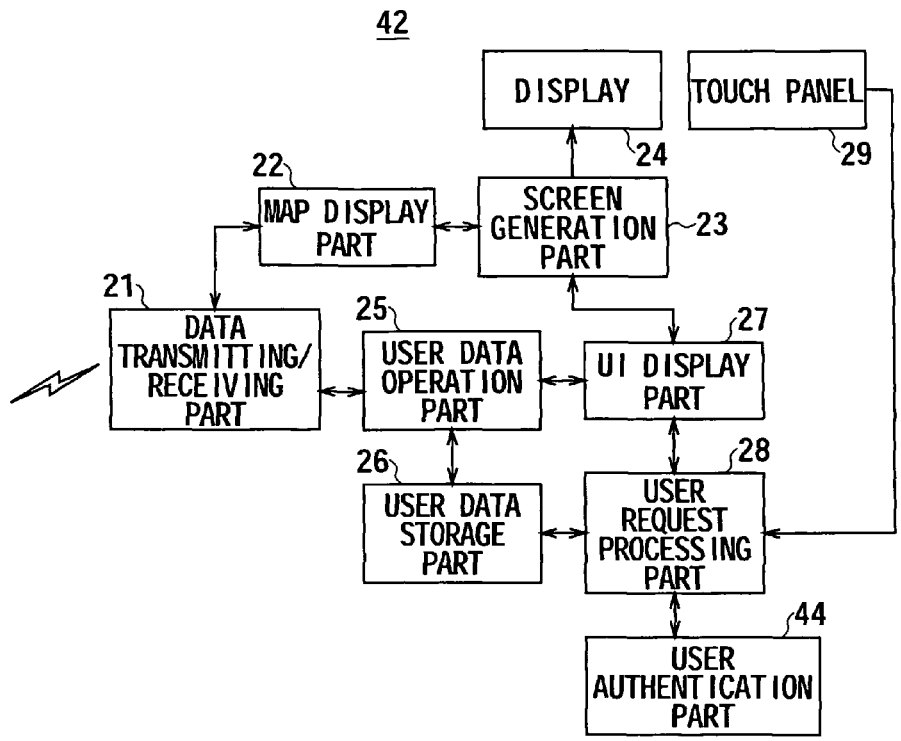
FIG. 13 is a schematic block diagram showing the circuit configuration of a first location free display according to the third embodiment.
Figure 14:
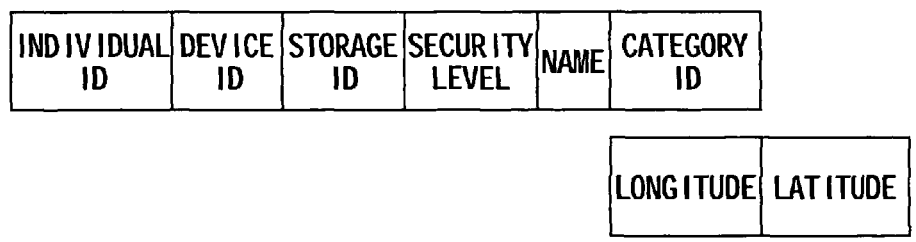
FIG. 14 is a schematic diagram showing the data structure of POI data according to the third embodiment.

In FIG. 13, in which the corresponding parts to FIG. 7 are designated by the same reference numerals, the first location free display 42 has the data transmitting/receiving part 21 for transmitting or receiving data to or from the navigation device 2 in accordance with a near distance radio communication system such as Bluetooth or IEEE802.11g. For instance, the route guide screen acquired from the navigation device 2 is displayed on the display 24 via the map display part 22 and the screen generation part 23.

The first location free display 42 can exchange data via the data transmitting/receiving part 21 with the second location free display 43. The POI data or routed at a acquired from the second location free display 43 via the data transmitting/receiving part 21 is stored in the user data storage part 26 via the user data operation part 25.

In the first location free display 42, a request inputted via the touch panel 29 on the display 24 is recognized by the user request processing part 28 and sent to the screen generation part 18 via the UI display part 27.

The screen generation part 18 reads the POI data according to the request from the user data storage part 26 via the user data operation part 15, reconfigures the route guide screen by adding the site information based on the POI data to the map data, and displays it on the display 24.

The first location free display 42 can receive the POI data or route data from the navigation device 2 or another second location free display 43. The POI data or route data are merged and sorted by the UI display part 27 to generate the merge/sort data in a predetermined table format, and a user data table based on the merge/sort data is displayed on the display 24 via the screen generation part 23.

When the user selects a desired item from the user data table displayed on the display 24, the first location free display 42 reads the detailed information of the POI data or route data corresponding to the selected item from the user data storage part 26 and displays it on the display 24, if the detailed information exists in the user data storage part 26.

On the other hand, the first location free display 42 acquires the detailed information of the POI data or route data corresponding to the selected item from the navigation device 2 or the second location free display 43, if the detailed information of the POI data or route data corresponding to the item selected by the user does not exist in its own user data storage part 26 but exists in the navigation device 2 or the second location free display 43.

More specifically, the first location free display 42 sends the POI data or route data corresponding to the selected item as the index data to the navigation device 2 or the second location free display 43, and acquires the detailed information corresponding to the index data from the navigation device 2 or the second location free display 43, if the detailed information of the POI data or route data corresponding to the selected item does not exist in its own user data storage part 26 but exists in the navigation device 2 or the second location free display 43.

Naturally, the navigation device 2 or the second location free display 43, like the first location free display 42, receives the POI data or route data as the index data from the first location free display 42, the second location free display 43 or the navigation device 2 other than itself to produce a user data table, and acquires the detailed information corresponding to the selected item based on the user data table.

Moreover, in the first location free display 42, a user authentication part 44 for authenticating the normal user for the first location free display 42 by a biometrics authentication method with the fingerprint or iris or an authentication method with the IC card is connected to the user request processing part 27. If the person of access is verified as the illegal user other than the normal user, any request from the person of access is ignored in the user processing part 27, whereby the person of access is limited to the normal user.

Figure 11:
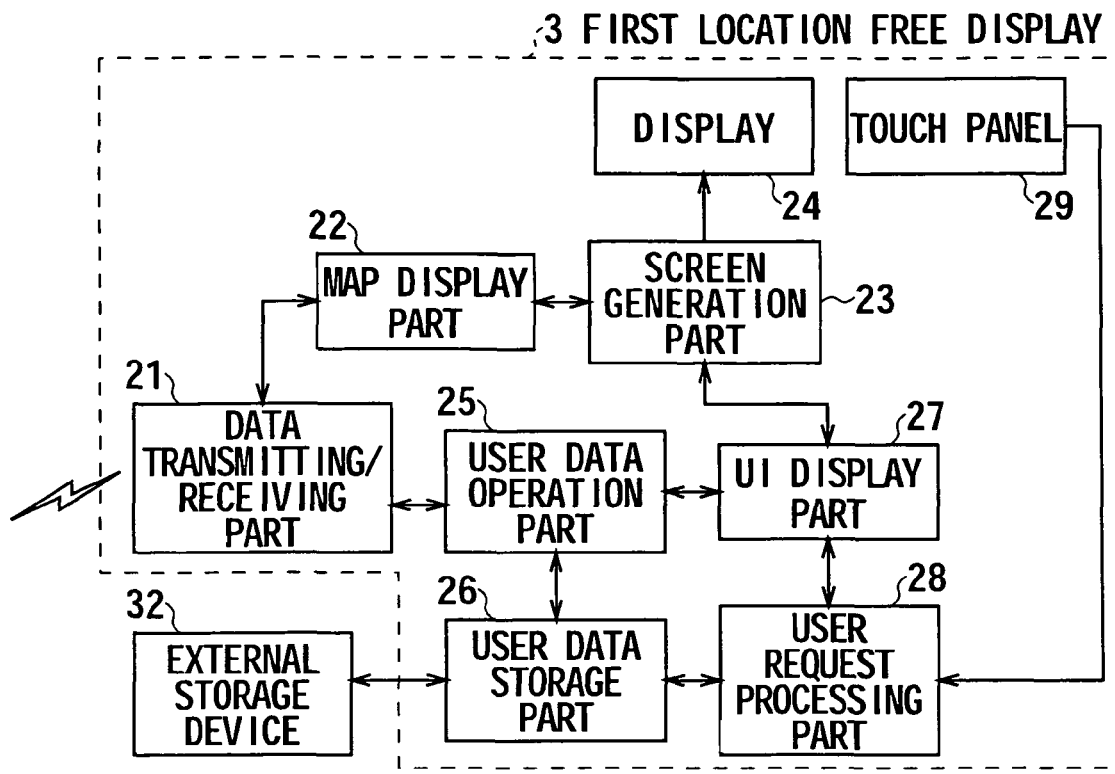
FIG. 11 is a schematic block diagram showing the circuit configuration of a first location free display according to the second embodiment.

In this case, the "security level" is provided as the new setting information for the POI data and route data, whereby the detailed information that can be shared among the navigation device 2, the first location free display 3 and the second location free display 4 can be separately limited for each user, as shown in FIGS. 10 and 11.

More specifically, in the vehicle mounted navigation system 41, when the detailed information is accessible to all the users who employ the navigation device 2, the first location free display 3 and the second location free display 4, or the detailed information is accessible only to the user of the navigation device 2, depending on the stage of security level, the access restriction may be varied by setting the security level.

(3-3) Operation and Effect

In the vehicle mounted navigation system 41 according to the third embodiment, it is determined whether or not the user is normal via the user authentication part 44 provided in the first location free display 42. If the user is recognized as illegal but not normal, any process is prohibited to avoid leakage of the personal information of the normal user stored in the user data storage part 26 or a file concerning the detailed information.

Also, in the first location free display 42 of the vehicle mounted navigation system 41, when the user is recognized as normal via the user authentication part 44, and the detailed information concerning the POI data or route data selected from the user data table is acquired, the detailed information that can be shared according to the stage of "security level" for the POI data or route data can be separately restricted, whereby the confidentiality of information for the normal user can be assured at the security level for each user.

In the vehicle mounted navigation system 41 of the above configuration, the navigation device 2, the first location free display 42 and the second location free display 43 can mutually share the index data such as POI data or route data, and the sharing of the detailed information is restricted for each user based on the user authentication result and the security level, whereby the confidentiality of information can be assured for each user and each user data.

(4) Other Embodiments

Though in the above first to third embodiments, the external storage devices 32 and 33 are connected to the first location free display 3 and the second location free display 4 according to the second embodiment, and the user authentication part 44 is provided in the first location free display 42 and the second location free display 43 according to the third embodiment, the invention is not limited thereto, but the external storage devices 32 and 33 may be connected to and the user authentication part 44 may be provided in the first location free display 3 and the second location free display 4.

Also, though in the above first to third embodiments, the navigation device 2, the first location free display 3, 42 and the second location free display 4, 43 are linked by radio in accordance with the near distance wireless communication method, the invention is not limited thereto, but they may be connected through wire.

Moreover, though in the above embodiments, when the detailed information of POI data or route data corresponding to the selected item is not owned in its own user data storage part 26 by the first location free display 3, but exists in the navigation device 2 or the second location free display 4, the detailed information of POI data or route data corresponding to the selected item is acquired from the navigation device 2 or the second location free display 4, the invention is not limited thereto, but the detailed information may be acquired in advance together with the index data from the navigation device 2 or the second location free display 4, and stored in the user data storage part 26.

Figure 3:
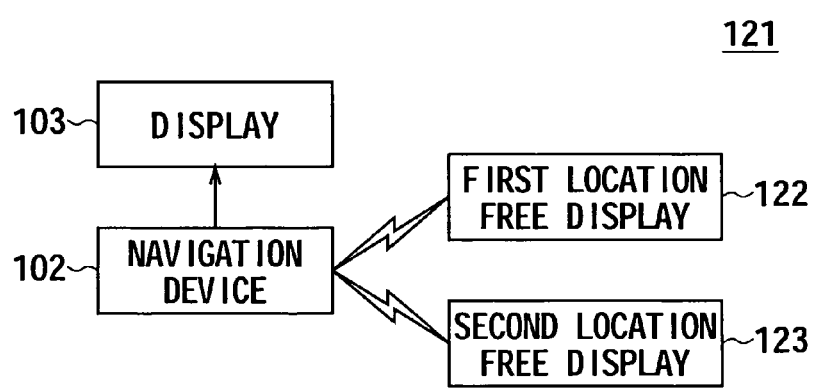
FIG. 3 is a schematic block diagram showing the configuration (2) of the vehicle mounted navigation system in related art.

Moreover, though in the above first to third embodiments, the first and second location free displays as the vehicle mounted user interface according to the invention are configured by hardware with the circuit configuration as shown in FIGS. 3, 7 and 9, the invention is not limited thereto, they may be configured by software by installing a navigation program for performing the same operation from a program storage medium such as CD-ROM storing the navigation program.

Further, though in the above first to third embodiments, the first and second location free displays as the vehicle mounted user interface according to the invention have the data transmitting/receiving part 21 as the transmitting/receiving part, the user data operation part 25, the UI display part 27 and the screen generation part 23 as the data management part, and the user data storage part 26, the invention is not limited thereto, but they may be configured by the transmitting/receiving part and the data management part with various other circuit configurations.

The vehicle mounted user interface device and the vehicle mounted navigation system of the invention are applicable to the uses where the data is exchanged between the navigation device and the vehicle mounted user interface device connected to the navigation device.

It should be understood by those skilled in the art that various modifications, combinations, sub-combinations and alternations may occur depending on design requirements and other factors insofar as they are within the scope of the appended claims or the equivalents thereof.

The invention claimed is:

1. A user interface device for accessing and sharing data with a navigation device and other user interface devices, the user interface device comprising:
   a transmitter-receiver for transmitting and receiving data with the navigation device and the other user interface devices;
   a data management unit for managing and saving user data internal to the user interface device and external data received from the navigation device and the other user interface devices; the data management unit merges and sorts the external data and the user data for display on the user interface device; and the data management unit shares the external data and the user data with the navigation device or the other user interface devices;
   wherein the merged and sorted data includes at least Point Of Interest (POI) data that is generated in response to' input of a user through at least one of a user request processing part of the user interface device, a user request processing part of the navigation device and a user request processing part of the other user interface devices,
   each of the user interface devices being operable to transmit route data to another of the user interface devices, the route data including an individual identification (ID) identifying the user interface device or one of the other user interface devices, a device type ID indicating the device type of the user interface device or the device type of one of the other user interface devices, a storage ID identifying a user data storage part associated with the user interface device or one of the other user interface devices or an external storage device associated with the user interface device or one of the other user interface devices, and a name indicative of a site associated with the route data.

* * * * *